(12) United States Patent
Morrill

(10) Patent No.: X8598
(45) Date of Patent: Jan. 16, 1835

(54) BEE-HIVE

(76) Inventor: Samuel Morrill

Samuel Morrill. Dixfield Maine
Letters Patent.

The Schedule referred to in these Letters Patent and
making part of the same containing a description in the
words of the said Samuel Morrill himself of his improve
ment in the Bee Hive.

To all to whom these presents shall come
Be it known that I Samuel Morrill of Dixfield in
the County of Oxford and State of Maine have invented
a new and useful improvement in the Bee Hive and
the following is a full and accurate description of my said
improvement — I prepare a Hive of the ordinary
dimensions about one foot and one half high and about
sixteen inches across the same. and a wooden plate from
one half of an inch to an inch in thickness of the full
size of the inside of the Hive. this plate is to be confined
about eight inches from the top of the Hive. and is per
forated with small holes to admit the Bees to pass through
them — I take common Glass Tumblers and place them
inverted on the plate having first placed a thin piece of
wood over the mouth of each Tumbler perforated with a hole sufficient
ly large to admit the bees
The Hive is prepared with a lid to rise on hinges and
also sticks in the usual form to support the comb
below the wooden plate. I then prepare two or more low
er rooms to the Hive of the form represented in the accom
panying drawings and marked Figs 2 & 3. The sides
of these lower Rooms are attached to the tops of these
rooms by hinges so as to open and admit of putting
in and taking out the Tumblers when necessary. The tumblers are placed in the same manner in the sides of the lower rooms
as in the top of the main Hive — The bottom of these lower
rooms are perforated in the same manner that the plate above
described is. so as to admit the ingress and egress of the Bees.
the main Hive fig 1 is inserted into the second Story Fig 2. and
rests upon the Bottom of that Story. The middle of the two low-
er rooms or Stories is made in the same manner that the interior
part of an ordinary Hive is. holes are made in the side of the
hive to admit the Bees — Tumblers or small boxes may be
used in the lower Stories at pleasure. when Tumblers are used
it is better to put a little honey comb into the Tumbler.

The drawings give a correct representation of the form of the hive
What I claim as new and my own invention and as an
improvement upon the hive patented by me on the fourth
day of February AD 1834. are. the manner of constructing
the lower Stories & of inserting the main hive. and the general
form and arrangement of the several parts of the hive Witnesses
Jno Otis
Wm Rowe Samuel Merrill (Drawing)